US011196908B2

(12) United States Patent
Kang et al.

(10) Patent No.: US 11,196,908 B2
(45) Date of Patent: Dec. 7, 2021

(54) ELECTRONIC DEVICE HAVING CAMERA MODULE CAPABLE OF SWITCHING LINE OF SIGHT AND METHOD FOR RECORDING VIDEO

(71) Applicant: Samsung Electronics Co., Ltd., Suwon-si (KR)

(72) Inventors: Changhoon Kang, Suwon-si (KR); Byounggeun Choi, Suwon-si (KR); Daehun An, Suwon-si (KR); Sunmi Kwon, Suwon-si (KR); Sanghun Kim, Suwon-si (KR); Jungwoo Won, Suwon-si (KR); Hyekyoung Jeon, Suwon-si (KR); Jonghoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/875,403

(22) Filed: May 15, 2020

(65) Prior Publication Data
US 2020/0374437 A1 Nov. 26, 2020

(30) Foreign Application Priority Data
May 23, 2019 (KR) .................. 10-2019-0060840

(51) Int. Cl.
*H04N 5/225* (2006.01)
*H04N 5/232* (2006.01)
*H04N 5/268* (2006.01)

(52) U.S. Cl.
CPC ....... *H04N 5/2259* (2013.01); *H04N 5/22525* (2018.08); *H04N 5/23216* (2013.01); *H04N 5/268* (2013.01)

(58) Field of Classification Search
CPC ............. H04N 5/2259; H04N 5/22525; H04N 5/23216; H04N 5/268; H04N 5/772; H04N 5/262; H04N 5/232; H04N 5/23293
See application file for complete search history.

(56) References Cited

U.S. PATENT DOCUMENTS 9,507,241 B1 * 11/2016 Schantz ............... G03B 11/043
9,749,541 B2 8/2017 Cobb et al.
(Continued)

FOREIGN PATENT DOCUMENTS

CN 108769514 A 11/2018
KR 10-2017-0006014 A 1/2017
(Continued)

OTHER PUBLICATIONS

International Search Report dated Aug. 31, 2020, issued in International Application No. PCT/KR2020/006453.
(Continued)

*Primary Examiner* — Timothy J Henn
(74) *Attorney, Agent, or Firm* — Jefferson IP Law, LLP

(57) ABSTRACT

An electronic device including a camera module capable of changing a sightline and a method of recording video thereof are provided. The electronic device includes a display, a camera module capable of changing a sightline, a driving module configured to control changing of a sightline of the camera module, a processor connected to the display, the camera module, and the driving module, and a memory connected to the processor, and configured to store instructions. The instructions enable the processor to perform operations, the operations including obtaining a first image via the camera module, displaying a preview image of the obtained first image on the display, and recording the first image as video, pausing recording of the video, providing a sightline change effect image as a preview image, and
(Continued)

controlling the driving module, adjusting the first set value to a second set value mapped to the second direction, obtaining a second image via the camera module, and providing the preview image, and recording the second image to be subsequent to the paused first image.

18 Claims, 8 Drawing Sheets

(56) References Cited

U.S. PATENT DOCUMENTS

| | | | |
|---|---|---|---|
| 2007/0120960 A1 | 5/2007 | Chang | |
| 2013/0329100 A1* | 12/2013 | Desai | H04N 5/76 |
| | | | 348/262 |
| 2014/0307101 A1* | 10/2014 | Cobb | H04N 9/802 |
| | | | 348/169 |
| 2015/0109401 A1* | 4/2015 | Kasatani | G06T 5/006 |
| | | | 348/14.07 |
| 2017/0163899 A1 | 6/2017 | Irie et al. | |
| 2017/0244906 A1 | 8/2017 | Lee et al. | |
| 2018/0041692 A1 | 2/2018 | Qin et al. | |
| 2018/0227573 A1 | 8/2018 | Chen et al. | |
| 2019/0141307 A1 | 5/2019 | Youn et al. | |

FOREIGN PATENT DOCUMENTS

| | | |
|---|---|---|
| KR | 10-2017-0006559 A | 1/2017 |
| KR | 10-2017-0098093 A | 8/2017 |

OTHER PUBLICATIONS

European Search Report dated Sep. 17, 2020, issued in European Application No. 20175449.6.

* cited by examiner

ELECTRONIC DEVICE HAVING CAMERA MODULE CAPABLE OF SWITCHING LINE OF SIGHT AND METHOD FOR RECORDING VIDEO

CROSS-REFERENCE TO RELATED APPLICATION(S)

This application is based on and claims priority under 35 U.S.C. § 119 of a Korean patent application number 10-2019-0060840, filed on May 23, 2019, in the Korean Intellectual Property Office, the disclosure of which is incorporated by reference herein in its entirety.

BACKGROUND

1. Field

The disclosure relates to an electronic device. More particularly, the disclosure relates to an electronic device including a camera module capable of changing a sightline, and a method of recording video thereof.

2. Description of Related Art

Electronic devices (e.g., mobile terminals, smart phones, or wearable terminals) may provide a plurality of functions (e.g., a music reproduction function, a navigation function, a short-range wireless communication function (e.g., Bluetooth, Wi-Fi, a near field communication (NFC) function, a fingerprint recognition function, an electronic payment function, or the like).

Also, electronic devices may provide a picture (still image) shooting function or a video shooting (recording) function. For example, an electronic device may perform picture shooting or video shooting using a front camera located in the front side or a rear camera located in the back side.

The above information is presented as background information only to assist with an understanding of the disclosure. No determination has been made, and no assertion is made, as to whether any of the above might be applicable as prior art with regard to the disclosure.

SUMMARY

Generally, an electronic device may apply different shoot set values to a front camera and a rear camera. For example, an electronic device may apply, to the front camera, a shoot set value that is tuned to be appropriate for a selfie shot, and may apply, to the rear camera, a shoot set value that is tuned to be appropriate for a background shot. Also, the front camera and the rear camera of the electronic device may show different performances (e.g., a maximum resolution).

Due to the different set values and different performances, the electronic device may need to turn off the front camera and to turn on the rear camera when camera switching is performed from the front camera to the rear camera, or may need to turn off the rear camera and to turn on the front camera when camera switching is performed from the rear camera to the front camera. Also, if a single piece of video is shot using the front camera and the rear camera, the electronic device may perform video shooting based on a camera having a relatively low-performance (e.g., a resolution).

Recently, an electronic device including a camera module which is capable of changing a sightline (e.g., rotation or changing a direction) is being developed. If the sightline of the camera module is changed, an image obtained via the camera module may be rotated and/or flipped. Also, an unnecessary image (e.g., an image that does not need to be recorded but is obtained while the sightline of the camera module is changed) may be recorded while the sightline of the camera module is changed. Also, if the sightline of the camera module is changed, a shoot condition (e.g., a set value, an illumination, a focus, and the like) may be changed, and a low-quality image may be obtained (e.g., an out-of-focus image or an exposure-saturated image). Therefore, recent electronic devices may need a scheme that appropriately controls video shooting in consideration of various problems (constrains) which may be caused when the sightline of the camera module is changed.

Aspects of the disclosure are to address at least the above-mentioned problems and/or disadvantages and to provide at least the advantages described below. Accordingly, an aspect of the disclosure is to provide an electronic device according to various embodiment that may efficiently control video shooting although a shoot condition is changed due to changing of the sightline of the camera module (e.g., the sightline is rotated from the front side to head toward the back side, or the sightline is rotated from the back side to head toward the front side).

Additional aspects will be set forth in part in the description which follows and, in part, will be apparent from the description, or may be learned by practice of the presented embodiments.

In accordance with an aspect of the disclosure, an electronic device is provided. The electronic device includes a camera module that an image sensor's rotation/flip register and an image-quality tuning parameter are appropriately changed based on a shoot condition associated with the change of the sightline of the camera module, so as to efficiently control video shooting.

An electronic device according to various embodiments may pause recording of an image, obtained via a camera module while the sightline of the camera module is changed, as video, and providing a designated image, in place of the image obtained via the camera module of which the sightline is being changed, as a preview image.

An electronic device according to various embodiments may pause recording of an image, obtained via a camera module while the sightline of the camera module is changed, as video, and if a predetermined condition is satisfied after completion of the change of the sightline of the camera module, may record an image, obtained via the camera module of which the sightline has been changed, to be subsequent to the image recorded before the change of the sightline of the camera module, so as to resume recording the video.

In accordance with an aspect of the disclosure, an electronic device is provided. The electronic device includes a housing, a display, a camera module coupled to one side of the housing, and configured to be capable of changing a sightline, a driving module configured to control changing of a sightline of the camera module, at least one processor operatively connected to the display, the camera module, and the driving module, and a memory operatively connected to the at least one processor, and configured to store instructions. Upon execution, the instructions enable the at least one processor to perform operations, the operations including in response to a video shooting request, obtaining a first image via the camera module, based on a first set value mapped to a first direction in which the camera module faces, displaying a preview image of the obtained first image on the display, and recording the first image as video, receiving an input for requesting changing of the sightline of the camera module to a second direction, which is different from the first direction, while recording the first image, in response to the received input, pausing recording of the video, providing a sightline change effect image as a preview image, and controlling the driving module so that the camera module faces in the second direction, adjusting the first set value to a second set value mapped to the second direction, in response to changing of the sightline of the camera module, after completing changing of the sightline and adjustment, obtaining a second image via the camera module, based on the second set value, and providing the preview image, based on the obtained second image, and recording the second image to be subsequent to the recorded first image, so as to resume recording the video.

In accordance with an aspect of the disclosure, a method of recording video by an electronic device is provided, the method includes obtaining a first image via a camera module, based on a first set value mapped to a first direction in which a camera module faces, in response to a video shooting request, displaying a preview image of the obtained first image on a display, and recording the first image as video, receiving an input for requesting changing of a sightline of the camera module to a second direction, which is different from the first direction, while recording the first image, in response to the received input, pausing recording of video, providing a sightline change effect image as a preview image, and controlling a driving module so that the camera module faces in the second direction, adjusting the first set value to a second set value mapped to the second direction, in response to changing of the sightline of the camera module, obtaining a second image via the camera module, based on the second set value, after completing changing of the sightline and adjustment, and providing the preview image, based on the obtained second image, and recording the second image to be subsequent to the recorded first image, so as to resume recording the video.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
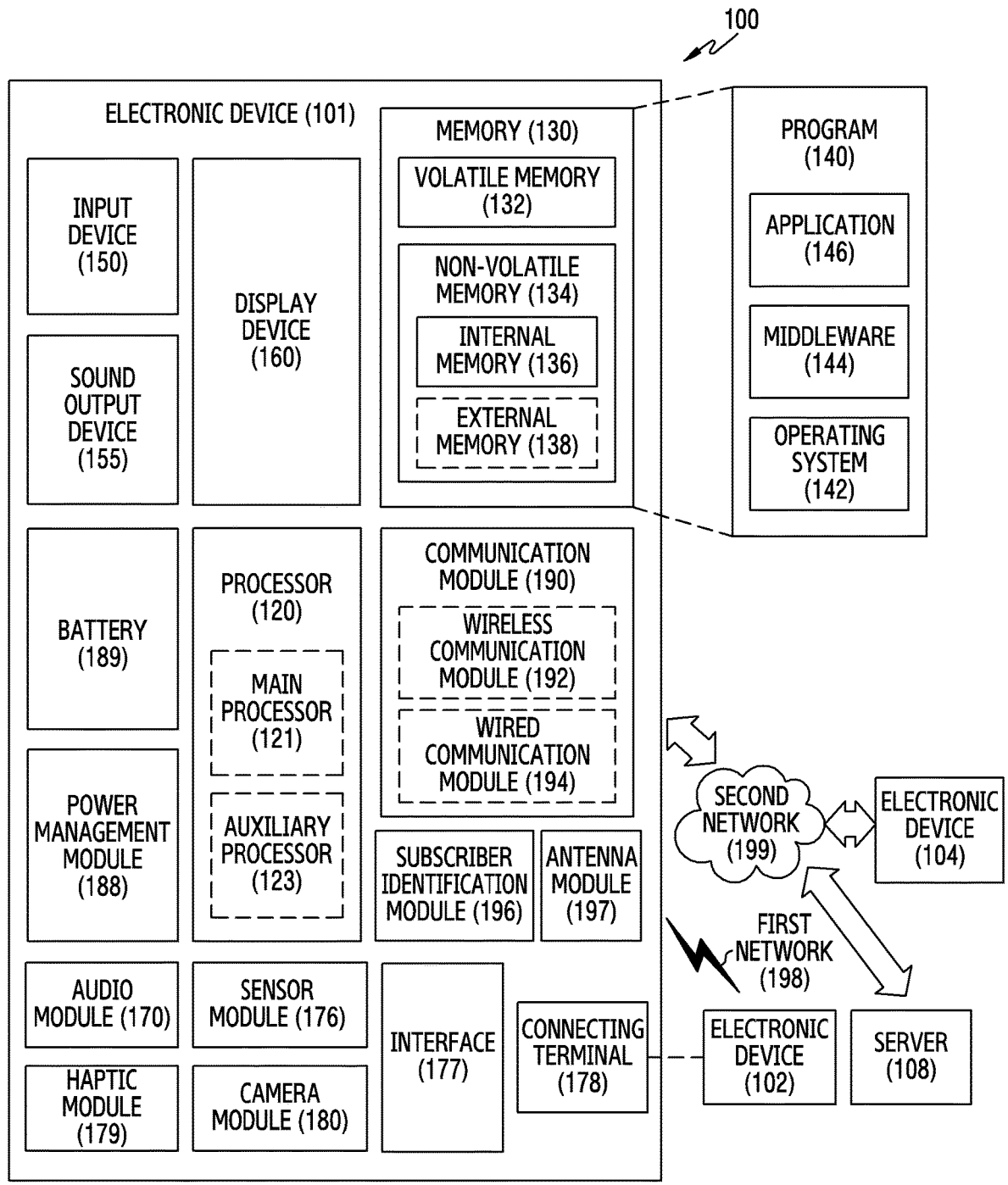
FIG. 1 is a block diagram illustrating an electronic device in a network environment according to an embodiment of the disclosure.

FIG. 1 illustrates an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or may be used to access an external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the camera module 180 may be capable of changing a sightline (rotating or changing a direction). For example, the camera module 180 may change the sightline from a first direction (the front side where the display device 160 is located) to a second direction which is the opposite direction of the first direction (e.g., 180-degree rotation). Similarly, the camera module 180 may change the sightline from the second direction to the first direction.

According to an embodiment, the camera module 180 is located inside a housing to head toward the second direction, and the camera module 180 may slide up and rotate to the first direction if changing of the sightline is requested.

According to an embodiment, the electronic device 101 may further include a driving module (not illustrated) capable of controlling changing of the sightline (rotation and/or slide) of the camera module 180.

Figure 2:
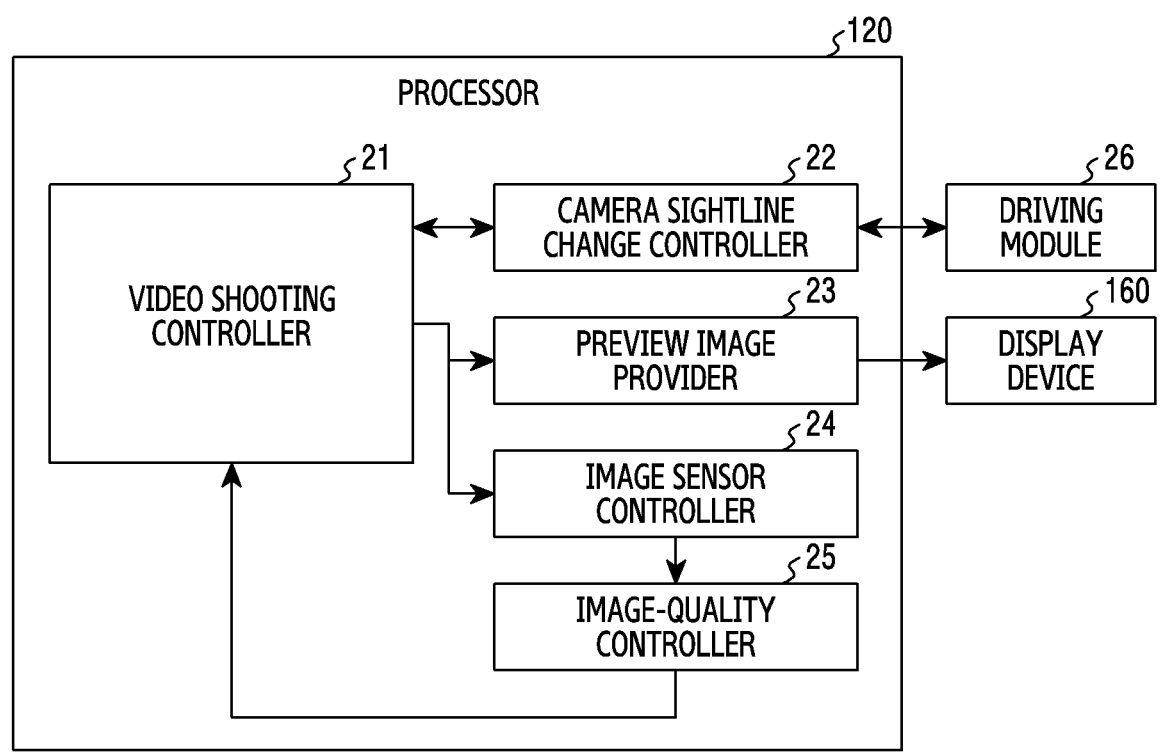
FIG. 2 is a diagram illustrating the processor of FIG. 1 in detail according to an embodiment of the disclosure.

FIG. 2 is a diagram illustrating the processor of FIG. 1 in detail according to an embodiment of the disclosure.

Referring to FIG. 2, the processor 120 according to an embodiment may include a video shooting controller 21, a camera sightline change controller 22, a preview image provider 23, an image sensor controller 24, and an image-quality controller 25.

The video shooting controller 21 may control a video recording function (e.g., a video recording application). For example, the video shooting controller 21 may control start, pausing, resuming, or stopping of recording of an obtained image as video, in response to a user input. The video shooting controller 21 may start recording video if a start input for recording is received, may pause recording of an obtained image as video if a pause input is received, may resume recording of an obtained image as video if a resume input is received, and may stop and terminate recording of video if a stop input is received.

The video shooting controller 21 according to an embodiment may control video shooting (recording) when the sightline (rotation or changing of a direction) of a camera module is changed. For example, if a sightline change input is received while a video shot is performed, the video shooting controller 21 may command a recording unit (e.g., a video recording application) to pause, so as to temporarily stop recording an obtained image as video. In this instance, the video shooting controller 21 may perform control so as to maintain output of a preview image and may control the preview image provider 23 to display a sightline change effect image (or a preview substitute image) by overlaying the preview image. Alternatively, the video shooting controller 21 may substitute the sightline change effect image for the preview image.

If changing of the sightline of the camera module by the driving module 26 is complete, the video shooting controller 21 may command the recording unit to resume recording. According to an embodiment, if a predetermined condition is satisfied after completion of changing of the sightline of the camera module, the video shooting controller 21 may command the recording unit to resume recording. The predetermined condition may refer to the state in which an automatic focus (AF), automatic white balance (AWB), and automatic exposure AE) are valid (e.g., normally performed) in association with changing of the sightline of the camera module.

According to an embodiment, if changing of the sightline of the camera module is abnormally completed, the video shooting controller 21 may command the recording unit to stop recording.

The camera sightline change controller 22 may control changing of the sightline of the camera module. For example, the camera sightline change controller 22 may control the driving module (e.g., an actuator) 26, so as to change the sightline of the camera module from a first direction to a second direction, or from the second direction to the first direction. According to an embodiment, the camera sightline change controller 22 may control the driving module 26 so that the camera module slides up from the inside of the housing of the electronic device to the outside, rotates from the second direction (the back side direction) to the first direction (the front side direction) or rotates from the first direction to the second direction, and slides down from the outside of the housing to the inside.

The camera sightline change controller 22 may control the state of the camera module. For example, if an error situation occurs due to an external factor, the camera sightline change controller 22 may transfer the error situation to the video shooting controller 21. For example, if changing of the sightline of the camera module is physically disturbed, the camera sightline change controller 22 may recognize that an error occurs. According to an embodiment, the error may be recognized by the processor 120 or the video shooting controller 21. The processor 120 or the video shooting controller 21 may recognize that an error occurs if an image is not changed and the same image or a similar image is obtained even though a predetermined period of time elapses after changing of the sightline is commanded.

If changing of the sightline of the camera module is requested while video shooting is performed, the preview image provider 23 may provide a sightline change effect image as a preview image (displaying the same on the display device 160) while the sightline of the camera module is changed (or while recording an obtained image as video is paused). This is to prevent an unnecessary image (e.g., an image that is shot while the sightline of the camera module is changed, or an image in which exposure is saturated due to rapid change of illumination) from being provided to a user as a preview image, while the sightline of the camera module is changed. The sightline change effect image may be an image obtained by performing image processing (or applying a designated effect) to an image obtained at the point in time at which changing of the sightline is requested. For example, the sightline change effect image may be an image obtained by applying blurring, pixelizing, or black-and-white processing to an image obtained at the point in time at which changing of the sightline is requested. According to an embodiment, the sightline change effect image may be an image designated by a user among the various images (e.g., a still image, animation, or video) stored in the electronic device. According to an embodiment, the sightline change effect image may include a notification message (e.g., a popup message) indicating that the sightline of the camera module is being changed.

The image sensor controller 24 may control an image obtained by an image sensor of the camera module. For example, the image sensor controller 24 may adjust a register related to rotation and/or flip of an obtained image, in response to changing of the sightline of the camera module. For example, if the sightline is changed, the image sensor controller 24 may change a direction and/or a start point associated with reading out data from an image sensor, according to the changed sightline of the camera. In order to change the readout direction and/or start point, the image sensor controller 24 may turn off streaming, and may turn on streaming after changing the readout direction and/or start point.

According to an embodiment, the image sensor controller 24 may not change the readout direction and/or start point even though the sightline of the camera is changed, and may perform post-processing (e.g., rotation and flip) of the read-out data. For example, if the camera module rotates by 180 degrees, the image sensor controller 24 may rotate an image obtained via the rotated camera module by 180 degrees and may perform left-right flipping.

The image sensor controller 24 may turn off a flash if changing of the sightline is requested so that the camera module faces in the front side direction. For example, the image sensor controller 24 may turn off the flash at the point in time at which streaming is turned off after detection of a sightline change request that requests the camera module to face in the front side direction.

The image-quality controller 25 may selectively apply an image-quality tuning value which is different for each sightline of the camera (the direction in which the camera faces). For example, the electronic device may store tuning parameters related to a focus, an exposure, a white balance, and/or image processing (e.g., image signal processing (ISP) or image processing circuit (IPC)), for each sightline of the camera, and the image-quality controller 25 may select and apply a tuning parameter depending on the direction of the sightline of the camera. The tuning parameter may include a first tuning parameter mapped to the first direction (front side direction) and a second tuning parameter mapped to the second direction (back side direction). The first tuning parameter may include tuning parameters related to a scan start point (focus distance) of a focus set appropriate for a selfie shot, and related to an exposure, a white balance, and/or image processing set appropriate for a face image shot. The second tuning parameter may include tuning parameters related a scan start point of a focus set appropriate for a normal image shot, and related to an exposure, a white balance, and/or image processing set appropriate for a portrait and/or background image shot.

The image-quality controller 25 may control the camera module so as to perform processing associated with a focus, an exposure, a white balance, and/or image processing, based on a tuning parameter applied after changing of the sightline of the camera module is completed. According to an embodiment, the result of control of the image quality may be used as a condition for determining whether to resume recording an obtained image as video. Accordingly, an image that has a poor image quality due to the change of the sightline of the camera module (e.g., an exposure-saturated image or an out-of-focus image) may be prevented from being recorded as video. As described above, according to an embodiment, after processing associated with the focus, exposure, white balance, and/or image processing is completed in response to changing of the sightline of the camera module, recording video may be resumed and thus, deterioration of an image quality may be prevented.

According to various example embodiments of the disclosure, an electronic device (e.g., the electronic device 101) may comprise: a housing; a display (e.g., the display device 160); a camera module (e.g., the camera module 180) coupled to one side of the housing, and configured to be capable of changing a sightline; a driving module (e.g., the driving module 26) configured to control changing of a sightline of the camera module; a processor (e.g., the processor 120) operatively connected to the display, the camera module, and the driving module; and a memory (e.g., the memory 130) operatively connected to the processor, and configured to store instructions, wherein, upon execution, the instructions cause the processor to perform operations, the operations comprising: in response to a video shooting request, obtaining a first image via the camera module, based on a first set value (e.g., the first set value 711, 811) mapped to a first direction in which the camera module faces; displaying a preview image of the obtained first image on the display, and recording the first image as video; receiving an input for requesting changing of the sightline of the camera module to a second direction, which is different from the first direction, while recording the first image; in response to the received input, pausing recording of the video, providing a sightline change effect image as a preview image, and controlling the driving module so that the camera module faces in the second direction; adjusting the first set value to a second set value (e.g., the second set value 721, 821) mapped to the second direction, in response to changing of the sightline of the camera module; after completing changing of the sightline and adjustment, obtaining a second image via the camera module, based on the second set value; and providing the preview image, based on the obtained second image, and recording the second image to be subsequent to the paused first image, so as to resume recording the video.

According to various example embodiments, the sightline change effect image may include at least one of an image obtained by performing image-processing of the first image at a point in time at which the input is received, an image selected by a user among images stored in the electronic device, or a notification message reporting changing of the sightline of the camera module.

According to various example embodiments, the first set value may include various register values and parameter values which are tuned for the camera module to obtain a high-quality image in the first direction, and the second set value may include various register values and parameter values which are tuned for the camera module to obtain a high-quality image in the second direction.

According to various example embodiments, the register value may include a register value related to a rotation and flip of an image sensor in association with changing of the sightline of the camera module, and the parameter value may include a parameter value related to at least one of a focus, an exposure, a white balance, or image-processing.

According to various example embodiments, the memory may further store an instruction, which enables the processor to stop recording the video and to store a video file, if an error occurs while the sightline of the camera module is changed.

According to various example embodiments, the memory may further store an instruction, which enables the processor to turn off a flash if changing of the sightline is requested so that the camera module faces the face of a user.

According to various example embodiments, the instructions may cause the processor to: initialize the camera module, change a readout direction or start point of an image sensor in response to changing of the sightline of the camera module, and obtain the second image, based on the changed readout direction or start point; or initialize the camera module, and obtain the second image by rotating and/or flipping an image obtained via the camera module of which the sightline is changed without changing a readout direction or start point of the image sensor, in response to changing of the sightline of the camera module.

According to various example embodiments, the instructions may cause the processor to obtain the second image after normally completing processing in association with the focus, exposure, white balance, or image-processing.

According to various example embodiments, the camera module may comprise first identification information (e.g., the first identification information 713) corresponding to the first direction and second identification information (e.g., the second identification information 723) corresponding to the second direction, the first set value is mapped to the first identification information and the second set value is mapped to the second identification information, and the instructions may cause the processor to: determine identification information of the camera module, based on a direction in which the camera module faces at a point in time at which the video shooting is requested; and if the sightline of the camera module is changed, change a set value applied to the camera module to a set value mapped to identification information corresponding to a direction that corresponds to the changed sightline, without changing the determined identification information.

According to various example embodiments, the camera module may comprise a piece of identification information (e.g., the identification information 813), and the instructions may cause the processor to apply the first set value if the camera module faces in the first direction, and to apply the second set value if the camera module faces in the second direction.

Figure 3:
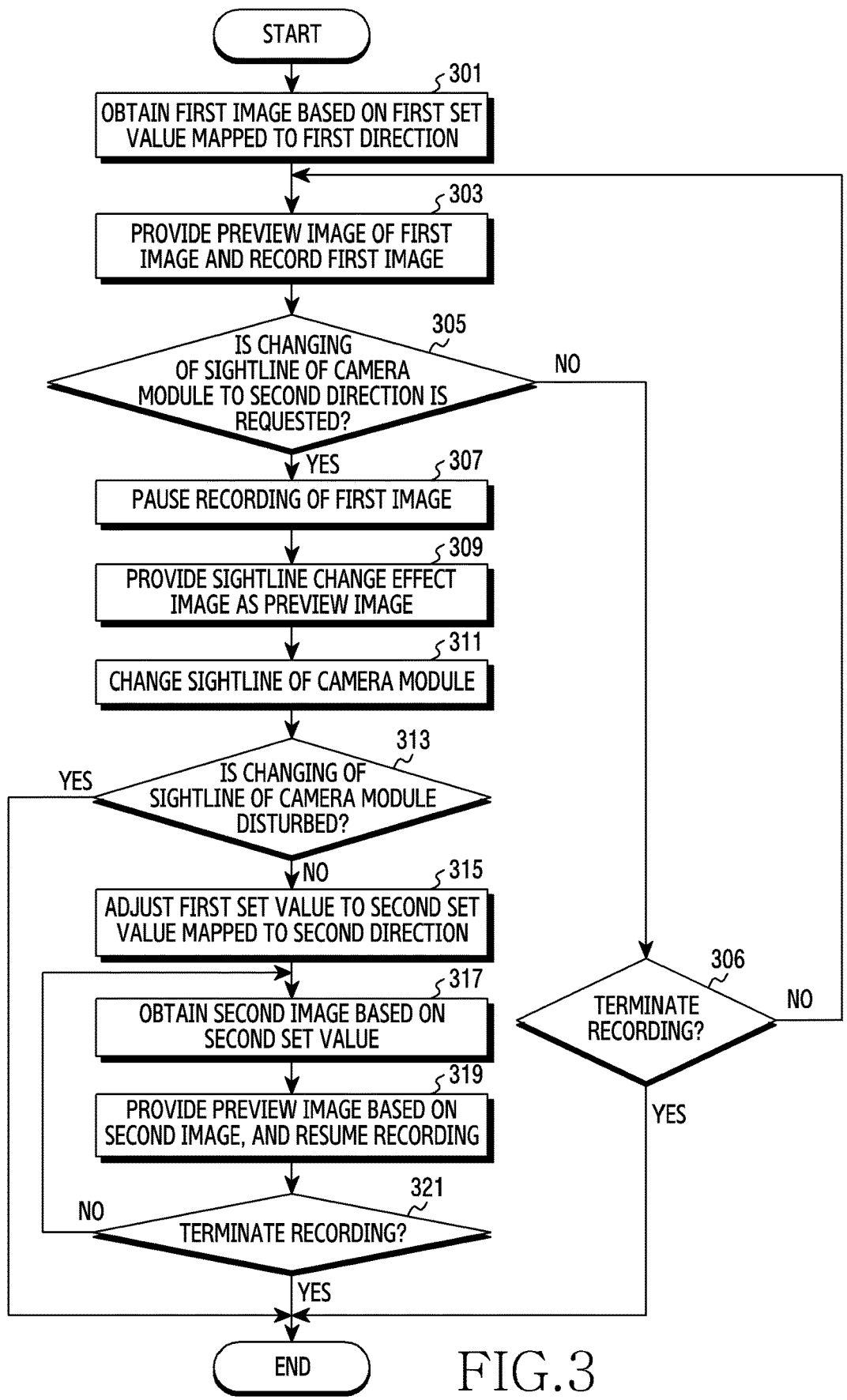
FIG. 3 is a flowchart illustrating a method of performing video shooting by an electronic device according to an embodiment of the disclosure.
Figure 4:
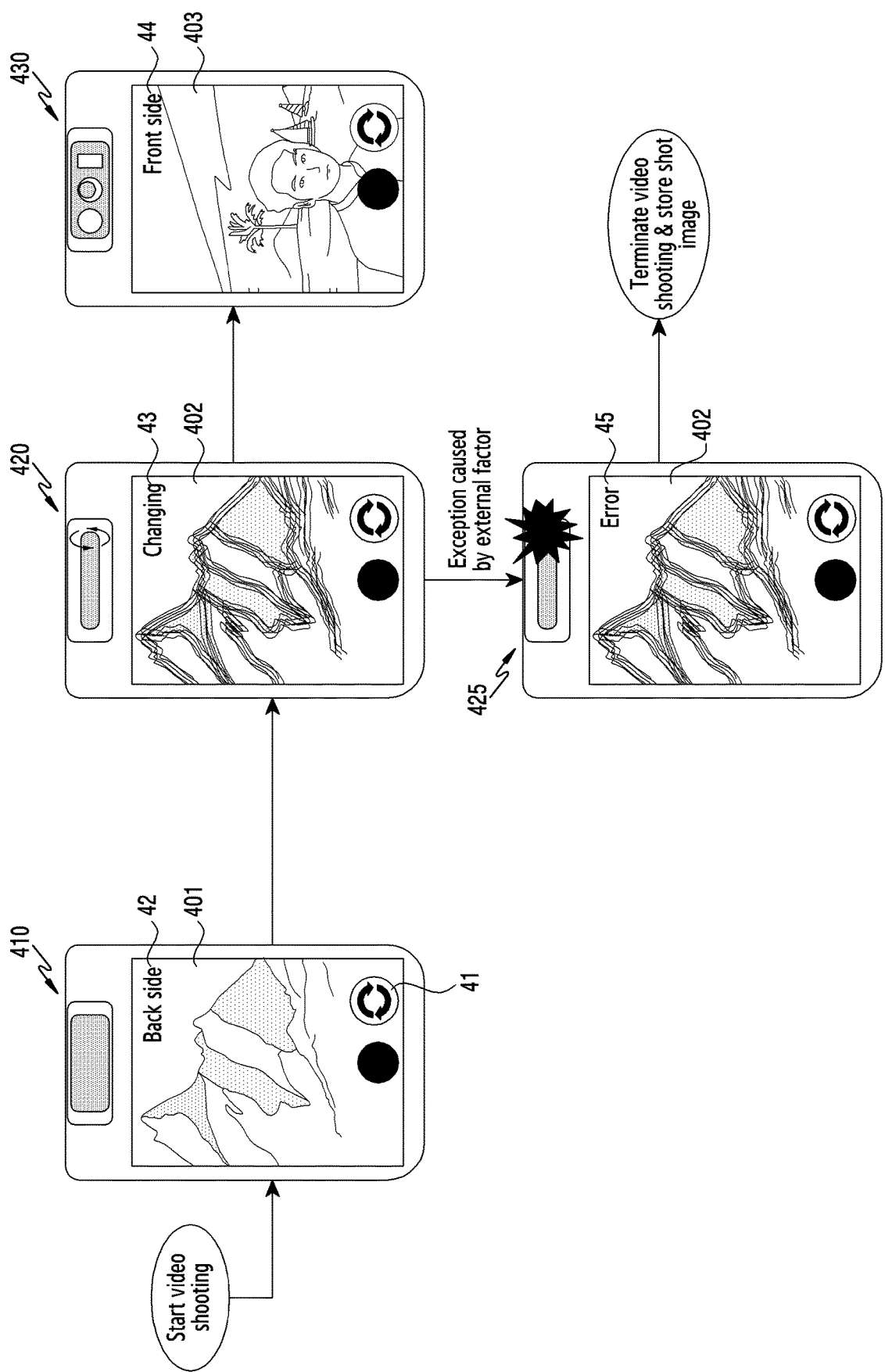
FIG. 4 is a diagram illustrating a method of performing video shooting by an electronic device according to an embodiment of the disclosure.

FIG. 3 is a flowchart illustrating a method of performing video shooting by an electronic device according to an embodiment of the disclosure, and FIG. 4 is a diagram illustrating a method of performing video shooting by an electronic device according to an embodiment of the disclosure.

Referring to FIGS. 3 and 4, a processor (e.g., the processor 120) of an electronic device (e.g., the electronic device 101) according to an embodiment may control the camera module to obtain a first image, based on a first set value mapped to a first direction (e.g., the direction in which the camera module (e.g., the camera module 180), capable of changing a sightline, is currently facing, and which may correspond to the front side direction or the back side direction), in operation 301. For example, in response to a video shooting request (or still image shooting request), the processor may identify the direction (e.g., the first direction) in which the camera module currently faces, and may control the camera module to obtain an image (e.g., the first image) based on a set value (e.g., the first set value) mapped to the identified direction. The first set value may include various register values (e.g., rotation and flip-related register values of an image sensor) and parameter values (e.g., parameter values related to a focus, an exposure, a white balance, image processing, and the like for tuning an image quality) which are tuned for the camera module to obtain a high-quality image under the assumption that the camera module faces in a predetermined direction (e.g., the front side direction).

The processor according to an embodiment may perform control so as to provide a preview image (e.g., output on a display (e.g., the display device 160)) based on the first image, and to record the first image in operation 303. For example, if an input for video shooting is received, the processor converts the first image obtained via the camera to output the same as a preview image, and starts recording the first image as video. According to an embodiment, the processor may provide a shoot direction in various manners (e.g., text or picture) in a portion of the preview image. For example, as illustrated in diagram 410 of FIG. 4, the processor may display text 42 indicating a shoot direction in the right upper portion of the preview image.

The processor according to an embodiment may identify whether changing of the sightline of the camera to a second direction is requested in operation 305, Here, the second direction may be a direction (e.g., the opposite direction) different from the first direction.

If the result of identification in operation 305 shows that changing of the sightline of the camera is not requested, the processor may identify whether termination of recording is requested in operation 306. If the result of identification in operation 306 shows that termination of recording is requested, the processor may stop performing video shooting. Conversely, if the result of identification in operation 306 shows that termination of recording is not requested, the processor may return to operation 303.

If the result of identification in operation 305 shows that changing of the sightline of the camera is requested, the processor may pause recording of the first image in operation 307. For example, as illustrated in diagram 410 of FIG. 4, if a selection (e.g., a touch) is detected on a sightline change menu 41 provided in a portion of the preview image 401, the processor may pause recording of the first image as video. In this instance, the processor may maintain providing the preview image. According to an embodiment, the processor may stop processing associated with a focus, an exposure, a white balance, and/or image-processing.

The processor according to an embodiment may provide a sightline change effect image as a preview image in operation 309. The sightline change effect image may be an image obtained by performing image-processing (or applying a predetermined effect (e.g., blurring, pixelizing, black-and-white processing, or the like)) with respect to the first image at the point in time at which the selection is detected on the sightline change menu 41. For example, the sightline change image 402 may be an image obtained by blurring the first image as illustrated in diagram 420 of FIG. 4. According to an embodiment, the sightline change effect image may be an image designated by a user among the various images (e.g., a still image, animation, or video) stored in the electronic device. According to an embodiment, the sightline change effect image may include a notification message (e.g., a popup message) indicating changing of the sightline of the camera module.

According to an embodiment, the processor may inform a user that the sightline of the camera is being changed, in various manners (e.g., text or a picture). For example, as illustrated in diagram 420 of FIG. 4, the processor may display text 43 indicating that the sightline is being changed in the right upper portion of the sightline change effect image.

The processor according to an embodiment may control a driving module (e.g., the driving module 26) to change the sightline of the camera module in operation 311. For example, as illustrated in diagrams 420 and 430 of FIG. 4, the processor may control the driving module so as to change the sightline of the camera module. According to an embodiment, the processor may initialize the camera module in operation 311. For example, the processor may turn off the camera module's streaming. If streaming is turned off, a pipe line of the camera module may be initialized.

According to an embodiment, when a flash is in the turned-on state, if the sightline of the camera module is changed to the direction (e.g., the front side direction) in which the camera module faces a user, the processor may turn off the flash. This is to prevent the flash from emitting light to eyes of the user, so that the user does not feel inconvenience.

The processor according to an embodiment may identify whether changing of the sightline of the camera module is disturbed in operation 313. For example, the processor may identify whether the sightline of the camera module is incompletely changed to the second direction due to an external factor.

If the result of identification in operation 313 shows that changing of the sightline of the camera module is disturbed, the processor may stop (or terminate) performing video shooting. For example, as illustrated in diagram 425 of FIG. 4, if changing of the sightline of the camera module is not allowed due to an external factor or since the driving module is broken, the processor may stop recording video and may not store the shot video. According to an embodiment, the processor may inform a user that changing of the sightline of the camera is not allowed, in various manners (e.g., text or a picture). For example, as illustrated in diagram 425 of FIG. 4, the processor may display an error message 45 indicating that the camera has a difficulty in changing the sightline, in the right upper portion of the sightline change effect image.

According to an embodiment, if a disturbance to changing of the sightline of the camera module is detected, the processor may display, on a display, a popup message reporting that changing of the sightline of the camera module is disturbed and asks whether to stop recording. If the user selects to stop recording or any input does not come within a predetermined period of time (e.g., 5 seconds), the processor may stop recording.

If the result of identification in operation 313 shows that changing of sightline of the camera module is not disturbed, the processor may adjust the first set value to a second set value mapped to the second direction in operation 315. The second set value may include various register values (e.g., rotation and flip-related register values of an image sensor) and parameter values (e.g., parameter values related to a focus, an exposure, a white balance, image processing, and the like for tuning an image quality) which are tuned for the camera module to obtain a high-quality image under the assumption that the camera module faces in a different direction (e.g., the back side direction).

The processor according to an embodiment may obtain a second image based on the second set value in operation 317.

The processor according to an embodiment may provide a preview image based on the second image and resume recording in operation 319. For example, as illustrated in diagram 430 of FIG. 4, the processor may convert the second image, obtained via the camera module of which the sightline has been changed to the second direction, to provide the same as a preview image 403, and may record the second image to be subsequent to the first image, so as to resume recording video. As described above, the processor may record the second image to be subsequent to the paused first image, so as to generate a single video file using the first image and the second image shot in different directions.

According to an embodiment, the processor may inform a user of the direction of the sightline of the camera in various manners (e.g., text or a picture). For example, as illustrated in diagram 430 of FIG. 4, the processor may display text 44 indicating that the camera faces in the front side direction in the right upper portion of the preview image.

The processor according to an embodiment may identify whether termination of recording is requested in operation 321. If the result of identification in operation 321 shows that termination of recording is requested, the processor may stop performing video shooting. Conversely, if the result of identification in operation 321 shows that termination of recording is not requested, the processor may return to operation 317.

According to an embodiment, after operation 317, the processor may further identify whether the result of processing associated with a focus, an exposure, a white balance, and/or image-processing with respect to the second image, obtained based on the second set value, are valid. If the result is valid, the processor may proceed with operation 319. Conversely, if the result is not valid, the processor may wait until a valid result is received during a predetermined period of time (e.g., 10 seconds). If a valid result is not received during the predetermined period of time, the processor may terminate recording. According to an embodiment, if a valid result is not received, the processor may report that processing associated with a focus, an exposure, a white balance and/or image-processing is not appropriate, may output a popup message for asking whether to resume or terminate recording, and may resume (e.g., recording an image of which the focus, exposure, and/or white balance is inappropriate) or terminate recording according to a selection by a user.

Although not illustrated in FIG. 3, after operation 319, if change (rotation) of the sightline of the camera to the first direction is requested, the processor may pause recording of the second image, similar to operations 307 to 319, may provide a sightline change effect image generated based on the second image as a preview image, may perform changing of the sightline of the camera module, may identify whether the changing of the sightline of the camera module is disturbed, may stop recording if a disturbance exists, may adjust the second set value to the first set value if a disturbance does not exist, may obtain a first image based on the first set value, and may provide a preview image based on the first image and resume recording.

Figure 5:
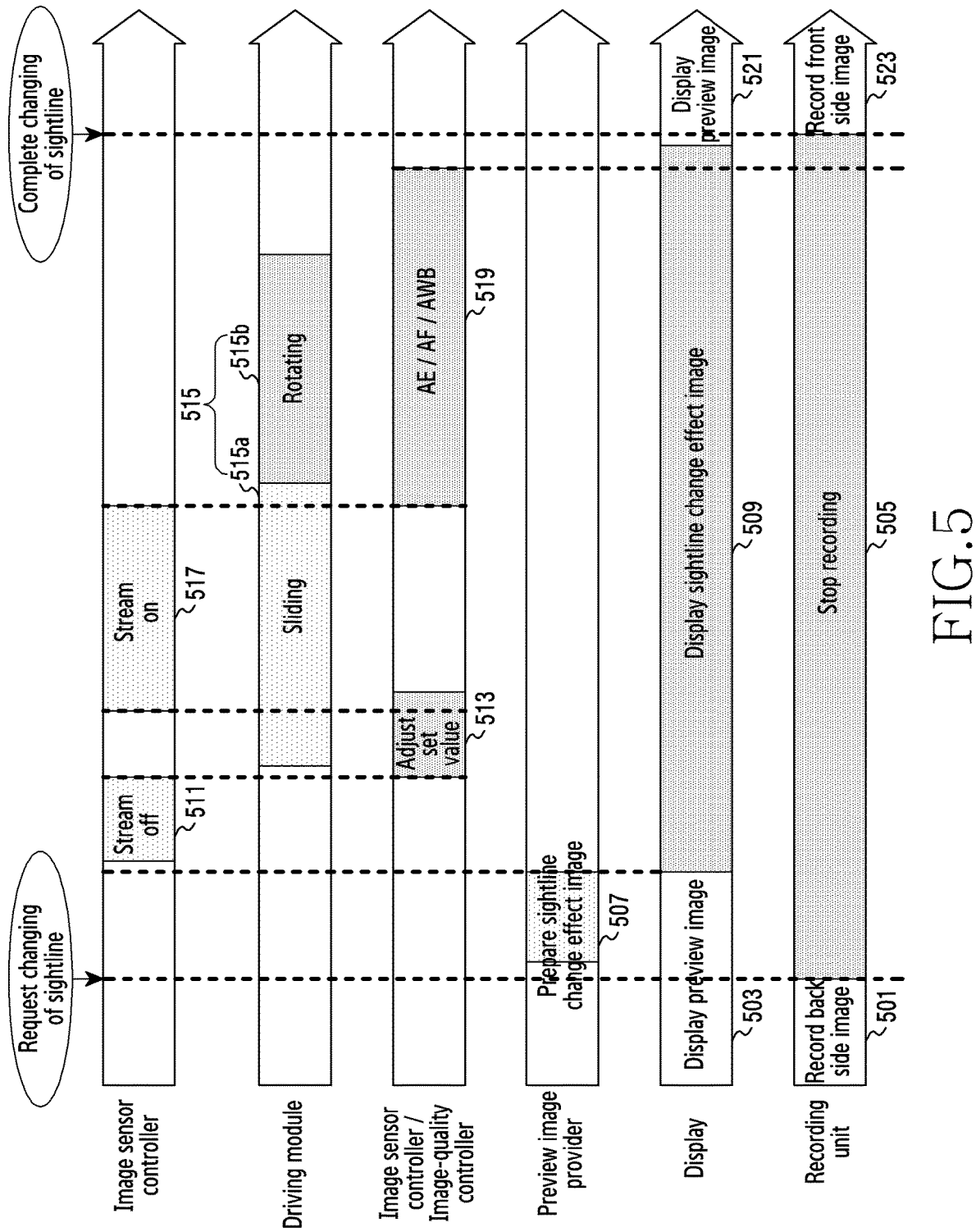
FIG. 5 is a flowchart illustrating a method of performing video shooting by an electronic device according to an embodiment of the disclosure.

FIG. 5 is a flowchart illustrating a method of performing video shooting by an electronic device according to an embodiment of the disclosure.

Referring to FIG. 5, a processor (e.g., the processor 120) of an electronic device (e.g., the electronic device 101) according to an embodiment may record a back side image obtained via a camera (e.g., the camera module 180) that faces in the back side direction, in response to a user request in operation 501. For example, the processor may control a recording unit to record the back side image as video. Also, the processor may control a display (e.g., the display device 160) to display a preview image in operation 503. The preview image may be obtained by converting the back side image to be appropriate for the performance (e.g., resolution) of the display.

If changing of the sightline is requested while recording video, the processor according to an embodiment may control the recording unit to pause recording of video in operation 505.

The processor may prepare a sightline change effect image in operation 507. According to an embodiment, operations 505 and 507 may be performed in parallel (e.g., the start point of the operations may be the same but the end points thereof may be different).

If the sightline change effect image is completely prepared, the processor may control the display to display the sightline change effect image as a preview image in operation 509.

The processor (e.g., the image sensor controller 24) may turn off streaming in operation 511. If streaming is turned off, a pipe line of the camera module may be initialized. According to an embodiment, operations 509 and 511 may start at the same time.

If streaming is completely turned off, the processor may adjust a set value (apply a register value and image-quality tuning parameter value of an image sensor which correspond to the direction in which the camera faces after rotation) in operation 513. For example, the processor may apply a register related to the rotation and/or flip of an image and may control turning on/off of a flash, using an image sensor controller, and may apply (change) a tuning parameter related to a focus, an exposure, a white balance, and/or image-processing, using an image-quality controller (e.g., the image-quality controller 25).

The processor (e.g., the camera sightline change controller 24) may change the sightline of the camera module in operation 515. For example, the processor may perform control a driving module (e.g., the driving module 26) so that the camera module, disposed inside the housing, slides up outside in operation 515a, and rotates in operation 515b. According to an embodiment, operations 513 and 515 may start at the same time.

If some of the set values (e.g., a set value that needs to be completely set before streaming is turned on) are completely adjusted, the processor may control the camera to turn on streaming in operation 517. If turning on streaming is completed, the processor may perform automatic focus, automatic exposure, and/or automatic white balance in operation 519. According to an embodiment, the processor may further perform image-processing in operation 519. According to an embodiment, operation 519 may be performed after rotation of the camera (operation 515) is completed.

If the automatic focus, automatic exposure, and/or automatic white balance are performed and the rotation of the camera is completed, the processor may control the display so as to display a preview image in operation 521. For example, the processor may control the display so as to remove the sightline change effect image, and to display a preview image corresponding to an image (a front side image) obtained via the camera which faces in the front side direction.

If changing of the sightline is completed, the processor may record the front side image in operation 523. For example, if changing of the sightline is completed, the processor may control the recording unit (e.g., may transmit a recording resume command to the recording unit) to record images (front side images), obtained via the camera which faces in the front side direction, to be subsequent to a previously recorded image (e.g., an image obtained via the camera which faces in the back side direction). According to an embodiment, at the point in time at which operation 519 is completed, operations 521 and 523 may start simultaneously.

Figure 6:
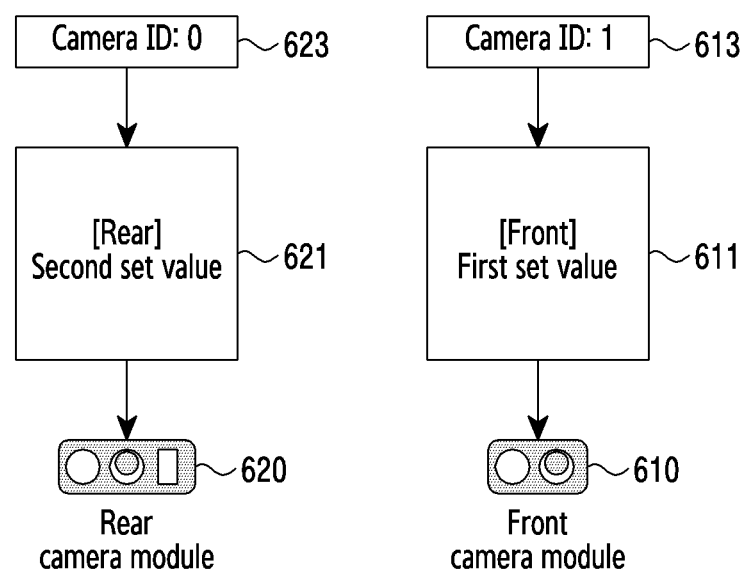
FIG. 6 is a diagram illustrating a method of applying a set value to a front camera and a rear camera of a conventional electronic device.

FIG. 6 is a diagram illustrating a method of applying a set value to a front camera and a rear camera of a conventional electronic device.

Referring to FIG. 6, a conventional electronic device may include a first camera 610 and a second camera 620, separately. The first camera 610 may be a front camera, and the second camera 620 may be a rear camera. Also, the conventional electronic device may store a first set value 611 applied to the first camera 610, and a second set value 621 applied to the second camera 620. The first set value 611 may be mapped to first identification information 613 that indicates the first camera 610, and may be stored. The second set value 621 may be mapped to second identification information 623 that indicates the second camera 620, and may be stored. In the conventional electronic device, the only first set value 611 is applied to the first camera 610, and only the second set value 621 is applied to the second camera 620. In the case of the conventional electronic device, identification information may be changed when the camera is changed.

Figure 7:
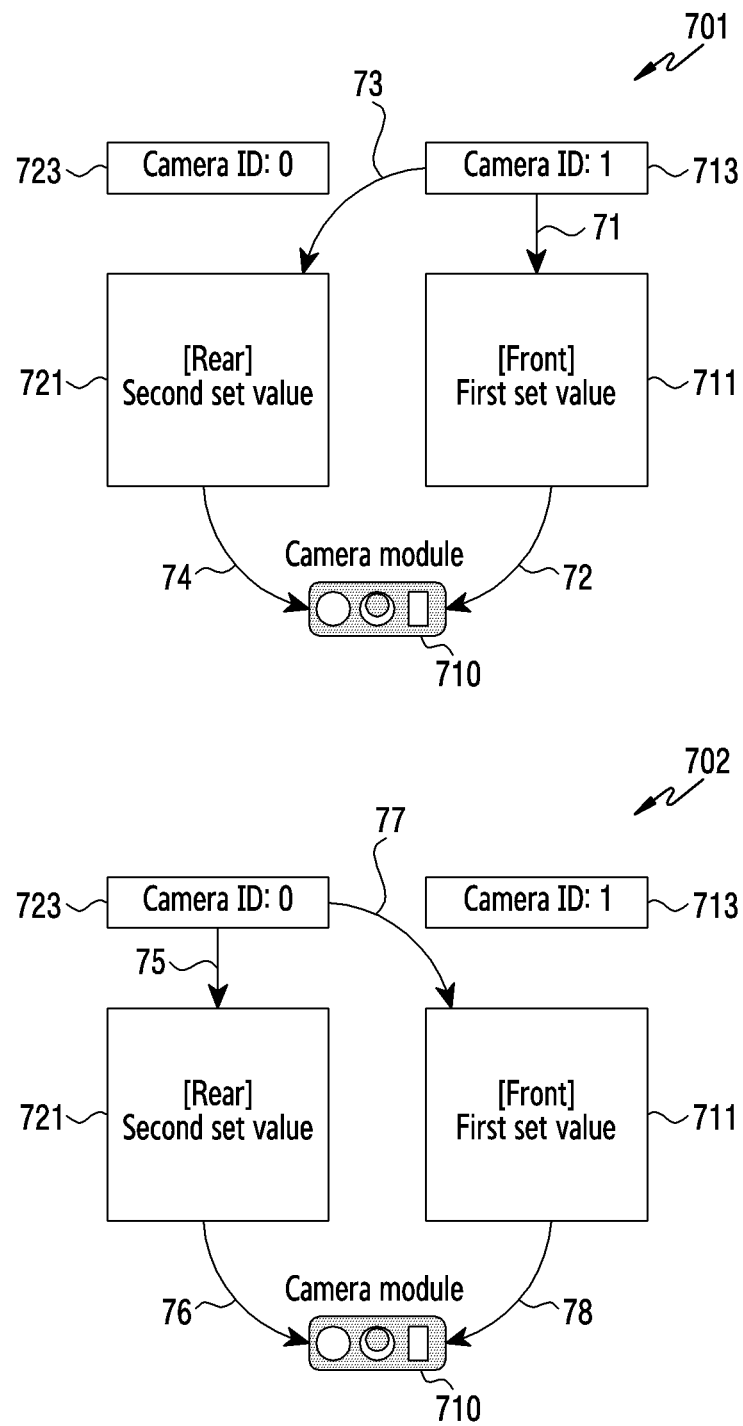
FIG. 7 is a diagram illustrating a method of changing a set value in response to changing of the sightline of a camera of an electronic device according to an embodiment of the disclosure.

FIG. 7 is a diagram illustrating a method of changing a set value in response to changing of the sightline of a camera of an electronic device according to an embodiment of the disclosure.

Referring to FIG. 7, the electronic device according to an embodiment may include a single camera 710 that is capable of changing a sightline. The electronic device may store a first set value 711 that is applied when the camera 710 faces in a first direction (front side direction), and a second set value 721 that is applied when the camera 710 faces in a second direction (back side direction). The first set value 711 may be mapped to first identification information 713 indicating that the camera 710 faces in the first direction, and may be stored. The second set value 721 may be mapped to second identification information 723 indicating that the camera 710 faces in the second direction, and may be stored. The camera 710 has two pieces of identification information in order to support compatibility with the platform (e.g., software structure) of the conventional camera.

The identification information of the camera 710 may be determined according to the direction in which the camera 710 faces at the point in time at which video shooting is requested. For example, if the camera 710 faces in the front side direction at the point in time at which video shooting is requested, the identification information of the camera 710 may be determined to be first identification information 713 as illustrated in diagram 701. In this instance, as indicated by arrows 71 and 72, the first set value 711 mapped to the first identification information 713 may be applied to the camera 710. In response to changing of the sightline of the camera 710, the electronic device may perform control so that the first identification information 713 is maintained and the second set value 721 is applied to the camera 710, as indicated by arrows 73 and 74.

If the camera 710 faces in the back side direction at the point in time at which the video shooting is requested, the identification information of the camera 710 may be determined to be second identification information 723 as illustrated in diagram 702. In this instance, as indicated by arrows 75 and 76, the second set value 721 mapped to the second identification information 723 may be applied to the camera 710. In response to changing of the sightline of the camera 710, the electronic device may perform control so that the second identification information 723 is maintained and the first set value 711 is applied to the camera 710, as indicated by arrows 77 and 78.

Figure 8:
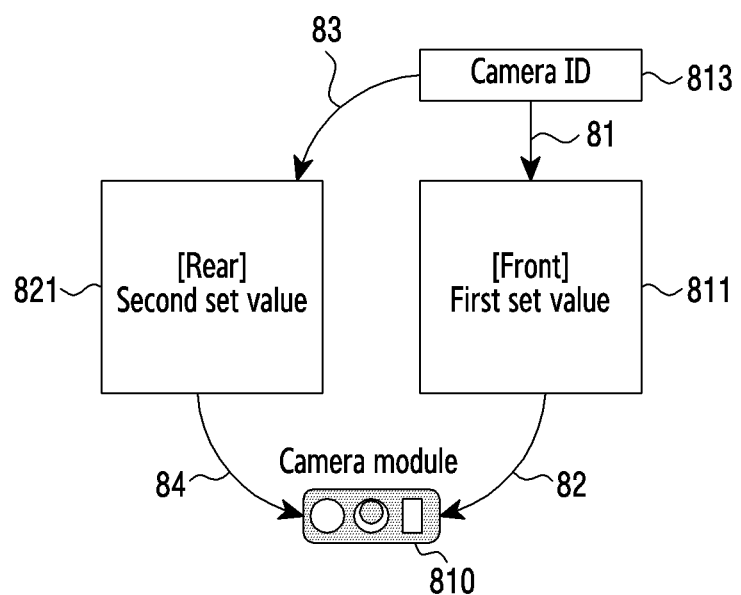
FIG. 8 is a diagram illustrating a method of changing a set value in response to changing of the sightline of a camera of an electronic device according to an embodiment of the disclosure.

FIG. 8 is a diagram illustrating a method of changing a set value in response to changing of the sightline of a camera of an electronic device according to an embodiment of the disclosure.

Referring to FIG. 8, the electronic device according to an embodiment may include a single camera 810 that is capable of changing a sightline. A single piece of identification information 813 may be allocated to the camera 810. The electronic device may store a first set value 811 that is applied when the camera 810 faces in a first direction (front side direction), and a second set value 821 that is applied when the camera 810 faces in a second direction (back side direction). The first set value 811 and the second set value 821 may be mapped to the identification information 813 and may be stored.

The electronic device may apply the first set value 811 or the second set value 821 to the camera 810, according to the direction in which the camera 810 faces. For example, if the camera 810 faces in the first direction (front side direction), the electronic device may apply the first set value 811 to the camera 810 as indicated by arrows 81 and 82. Conversely, if the camera 810 changes a sightline to head in the second direction, the electronic device may apply the second set value 821 to the camera 810 as indicated by arrows 83 and 84.

According to various example embodiments of the disclosure, a method of recording video by an electronic device (e.g., the electronic device 101) may comprise: obtaining a first image via a camera module (e.g., the camera module 180), based on a first set value (e.g., the first set value 711, 811) mapped to a first direction in which a camera module faces, in response to a video shooting request; displaying a preview image of the obtained first image on a display (e.g., the display device 160), and recording the first image as video; receiving an input for requesting changing of the sightline of the camera module to a second direction, which is different from the first direction, while recording the first image; in response to the received input, pausing recording of video, providing a sightline change effect image as a preview image, and controlling a driving module so that the camera module faces in the second direction; adjusting the first set value to a second set value (e.g., the second set value 721, 821) mapped to the second direction, in response to changing of the sightline of the camera module; obtaining a second image via the camera module, based on the second set value, after completing changing of the sightline and adjustment; and providing the preview image, based on the obtained second image, and recording the second image to be subsequent to the paused first image, so as to resume recording the video.

According to various example embodiments, the sightline change effect image may comprise at least one of an image obtained by performing image-processing of the first image at a point in time at which the input is received, an image selected by a user among images stored in the electronic device, or a notification message reporting changing of the sightline of the camera module.

According to various example embodiments, the first set value may include various register values and parameter values, which are tuned for the camera module to obtain a high-quality image in the first direction, and the second set value may include various register values and parameter values, which are tuned for the camera module to obtain a high-quality image in the second direction.

According to various example embodiments, the register value may include a register value related to a rotation and flip of an image sensor in association with changing of the sightline of the camera module, and the parameter value may include a parameter value related to at least one of a focus, an exposure, a white balance, or image-processing.

According to various example embodiments, the method may further comprise: if an error occurs while the sightline of the camera module is changed, stopping recording of the video and storing a video file.

According to various example embodiments, the method may further comprise: if changing of the sightline is requested so that the camera module faces the face of a user, identifying whether a flash is in a turned-on state; and if the flash is in the turned-on state, turning off the flash.

According to various example embodiments, the method may further comprise: initializing the camera module in response to the sightline change request of the camera module. The obtaining of the second image may comprise one of: in response to changing of the sightline of the camera module, changing a readout direction or start point of an image sensor, and obtaining the second image based on the changed readout direction or start point; or in response to changing of the sightline of the camera module, obtaining the second image by rotating and/or flipping an image obtained via the camera module of which the sightline is changed, without changing the readout direction or start point of the image sensor.

According to various example embodiments, the obtaining of the second image may comprise: identifying whether processing associated with the focus, exposure, white balance, or image-processing is normally complete; and obtaining the second image if the processing associated with the focus, exposure, white balance, or image-processing is normally complete.

According to various example embodiments, the camera module may comprise first identification information (e.g., the first identification information 713) corresponding to the first direction and second identification information (e.g., the second identification information 723) corresponding to the second direction. The first set value may be mapped to the first identification information and the second set value is mapped to the second identification information. Identification information of the camera module may be determined based on a direction in which the camera module faces at a point in time at which the video shooting is requested. The set value applied to the camera module, if the sightline of the camera module is changed, may be changed to a set value mapped to identification information corresponding to a direction that corresponds to the changed sightline of the camera module, without changing the determined identification information.

According to various example embodiments, the camera module may comprise a piece of identification information (e.g., the identification information 813). A set value to be applied to the camera module may be determined based on a direction in which the camera module faces.

An electronic device according to various embodiments may efficiently perform video shooting using a camera module capable of changing a sightline (e.g., rotating or changing a direction). For example, while the sightline of the camera module is changed, the electronic device may pause recording of an image obtained via the camera module as video, so as to prevent an unnecessary image from being recorded. Also, while the sightline of the camera module is changed, the electronic device may provide an image indicating that the sightline of the camera module is being changed, as a preview image. Also, the electronic device may apply an appropriate tuning parameter in response to changing of the sightline of the camera module, and may prevent deterioration in quality caused by the change of the sightline of the camera module. Also, if a predetermined condition is satisfied after the sightline of the camera module is changed, the electronic device may resume recording an image obtained via the camera module as video, so as to prevent deterioration in quality. Also, if the sightline of the camera module is changed to head to a user, the electronic device may turn off a flash so as to reduce an inconvenience for the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic devices 101). For example, a processor (e.g., the processor 120) of the machine (e.g., the electronic devices 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a display;
   a camera module coupled to one side of the housing, and configured to be capable of changing a sightline;
   a driving circuit configured to control changing of a sightline of the camera module;
   at least one processor operatively connected to the display, the camera module, and the driving circuit; and
   a memory operatively connected to the at least one processor, and configured to store instructions,
   wherein, upon execution, the instructions enable the at least one processor to perform operations, the operations comprising:
     in response to a video shooting request, obtaining a first image via a lens of the camera module, based on a first set value mapped to a first direction in which the camera module faces,
     displaying a preview image of the obtained first image on the display, and recording the first image as video,
     receiving an input for requesting changing of the sightline of the camera module to a second direction, which is different from the first direction, while recording the first image,
     in response to the received input, pausing recording of the video, providing a sightline change effect image as a preview image, and controlling the driving circuit so that the camera module faces in the second direction,
     adjusting the first set value to a second set value mapped to the second direction, in response to changing of the sightline of the camera module,
     after completing changing of the sightline and adjustment, obtaining a second image via the lens of the camera module, based on the second set value,
     providing the preview image, based on the obtained second image, and
     resuming recording of the video such that the second image captured after completing the changing of the sightline and adjustment based on the second set value is recorded subsequent to the recorded first image,
   wherein the first set value includes various register values and parameter values which are tuned for the camera module to obtain an image in the first direction, and
   wherein the second set value includes various register values and parameter values which are tuned for the camera module to obtain an image in the second direction.

2. The electronic device of claim 1, wherein the sightline change effect image includes at least one of an image obtained by performing image-processing of the first image at a point in time at which the input is received, an image selected by a user among images stored in the electronic device, or a notification message reporting changing of the sightline of the camera module.

3. The electronic device of claim 1,
   wherein the register values include a register value related to a rotation and flip of an image sensor in association with changing of the sightline of the camera module, and
   wherein the parameter values include a parameter value related to at least one of a focus, an exposure, a white balance, or image-processing.

4. The electronic device of claim 1, wherein the memory further stores an instruction, which enables the at least one processor to stop recording the video and to store a video file, based on an error occurring while the sightline of the camera module is changed.

5. The electronic device of claim 1, wherein the memory further stores an instruction, which enables the at least one processor to turn off a flash based on changing of the sightline being requested so that the camera module faces a user's face.

6. The electronic device of claim 1, wherein the instructions enable the at least one processor to:
   initialize the camera module, change a readout direction or start point of an image sensor in response to changing of the sightline of the camera module, and obtain the second image, based on the changed readout direction or start point; or
   initialize the camera module, and obtain the second image by rotating and/or flipping an image obtained via the camera module of which the sightline is changed without changing a readout direction or start point of the image sensor, in response to changing of the sightline of the camera module.

7. The electronic device of claim 3, wherein the instructions enable the at least one processor to obtain the second image after normally completing processing in association with the focus, exposure, white balance, or image-processing.

8. The electronic device of claim 1,
wherein the camera module comprises first identification information corresponding to the first direction and second identification information corresponding to the second direction,
wherein the first set value is mapped to the first identification information and the second set value is mapped to the second identification information, and
wherein the instructions enable the at least one processor to:
determine identification information of the camera module, based on a direction in which the camera module faces at a point in time at which the video shooting is requested, and
based on the sightline of the camera module being changed, change a set value applied to the camera module to a set value mapped to identification information corresponding to a direction that corresponds to the changed sightline, without changing the determined identification information.

9. The electronic device of claim 1,
wherein the camera module comprises a piece of identification information, and
wherein the instructions enable the at least one processor to:
apply the first set value based on the camera module facing in the first direction, and
apply the second set value based on the camera module facing in the second direction.

10. A method of recording video by an electronic device, the method comprising:
obtaining a first image via a lens of a camera module, based on a first set value mapped to a first direction in which the camera module faces, in response to a video shooting request;
displaying a preview image of the obtained first image on a display, and recording the first image as video;
receiving an input for requesting changing of a sightline of the camera module to a second direction, which is different from the first direction, while recording the first image;
in response to the received input, pausing recording of video, providing a sightline change effect image as a preview image, and controlling a driving circuit so that the camera module faces in the second direction;
adjusting the first set value to a second set value mapped to the second direction, in response to changing of the sightline of the camera module;
obtaining a second image via the lens of the camera module, based on the second set value, after completing changing of the sightline and adjustment;
providing the preview image, based on the obtained second image; and
resuming recording of the video such that the second image captured after completing the changing of the sightline and adjustment based on the second set value is recorded subsequent to the recorded first image,
wherein the first set value includes various register values and parameter values, which are tuned for the camera module to obtain an image in the first direction, and
wherein the second set value includes various register values and parameter values, which are tuned for the camera module to obtain an image in the second direction.

11. The method of claim 10, wherein the sightline change effect image comprises at least one of an image obtained by performing image-processing of the first image at a point in time at which the input is received, an image selected by a user among images stored in the electronic device, or a notification message reporting changing of the sightline of the camera module.

12. The method of claim 10,
wherein the register values include a register value related to a rotation and flip of an image sensor in association with changing of the sightline of the camera module, and
wherein the parameter values include a parameter value related to at least one of a focus, an exposure, a white balance, or image-processing.

13. The method of claim 10, further comprising:
based on an error occurring while the sightline of the camera module is changed, stopping recording of the video and storing a video file.

14. The method of claim 10, further comprising:
based on changing of the sightline being requested so that the camera module faces the face of a user, identifying whether a flash is in a turned-on state; and
based on the flash being in the turned-on state, turning off the flash.

15. The method of claim 10, further comprising:
initializing the camera module in response to the sightline change request of the camera module,
wherein the obtaining of the second image comprises at least one of:
in response to changing of the sightline of the camera module, changing a readout direction or start point of an image sensor, and obtaining the second image based on the changed readout direction or start point, or
in response to changing of the sightline of the camera module, obtaining the second image by rotating and/or flipping an image obtained via the camera module of which the sightline is changed, without changing the readout direction or start point of the image sensor.

16. The method of claim 12, wherein the obtaining of the second image comprises:
identifying whether processing associated with the focus, exposure, white balance, or image-processing is normally complete; and
obtaining the second image if the processing associated with the focus, exposure, white balance, or image-processing is normally complete.

17. The method of claim 10,
wherein the camera module comprises first identification information corresponding to the first direction and second identification information corresponding to the second direction,
wherein the first set value is mapped to the first identification information and the second set value is mapped to the second identification information,
wherein identification information of the camera module is determined based on a direction in which the camera module faces at a point in time at which the video shooting is requested, and
wherein, based on the sightline of the camera module being changed, the set value applied to the camera module is changed to a set value mapped to identification information corresponding to a direction that corresponds to the changed sightline of the camera module, without changing the determined identification information.

18. The method of claim 10,
wherein the camera module comprises a piece of identification information, and
wherein a set value to be applied to the camera module is determined based on a direction in which the camera module faces.

* * * * *